United States Patent [19]

Thompson et al.

[11] Patent Number: 5,785,457

[45] Date of Patent: Jul. 28, 1998

[54] PIPE PLACEMENT AND SUPPORT SYSTEM

[75] Inventors: Thomas G. Thompson, Belleville, Ill.; Albert B. Becker, Jr., Hot Springs, Ark.

[73] Assignee: Horner & Shifrin, Inc., St. Louis, Mo.

[21] Appl. No.: 736,420

[22] Filed: Oct. 24, 1996

Related U.S. Application Data

[60] Provisional application No. 60/007,593, Nov. 27, 1995.

[51] Int. Cl.$^6$ ........................................ J16L 1/06
[52] U.S. Cl. .................... 405/172; 405/154; 248/72
[58] Field of Search ........................... 405/172, 154, 405/157; 248/72, 73, 74.1

[56] References Cited

U.S. PATENT DOCUMENTS

| | | | |
|---|---|---|---|
| 2,373,439 | 4/1945 | Wheatley | 405/157 X |
| 4,252,466 | 2/1981 | Barti et al. | 405/172 |
| 4,338,045 | 7/1982 | Cour | 405/172 |
| 4,492,493 | 1/1985 | Webb | 405/172 |

FOREIGN PATENT DOCUMENTS

| | | | |
|---|---|---|---|
| 0018898 | 11/1980 | European Pat. Off. | 405/172 |
| 2536826 | 6/1984 | France | |

Primary Examiner—Tamara L. Graysay
Assistant Examiner—Frederick Lagman
Attorney, Agent, or Firm—Polster, Lieder, Woodruff & Lucchesi, LC

[57] ABSTRACT

A placement and support system for installing long lengths of connected pipe sections and method of using the same are provided having a series of pairs of spaced apart piles that are installed at predetermined sites by pile-driving into the floor of an expanse and, in particular, a body of water. Each pile has a bent seat at lower end and the piles are driven until the seats are positioned at the desired distance above the floor. The sections of pipe are preconnected on land or on a barge to a desired length. A prefabricated pipe saddle assembly is installed between each pair of piles and positioned above the water line by wedging or a hydraulic jack to form a series of pipe saddle assemblies. Each pipe saddle assembly has a transverse support beam. There is a pipe sleeve at each end of the support beam dimensioned to slide over the piles. A generally U-shaped pipe saddle is affixed to the transverse beam. The long pipe is positioned on the pipe saddles by crane or other appropriate tools or machinery and secured to each pipe saddle by a pair of U-bolts. The wedges or jacks are removed and the pipe slowly filled with water. The pipe sleeves slide down the piles until they abut the bent seats at or near the bottom. After the pipe is positioned, the piles are filled with concrete to a point slightly above the pipe and the empty pile above the pipe is removed.

10 Claims, 3 Drawing Sheets

PIPE PLACEMENT AND SUPPORT SYSTEM

STATEMENT REGARDING FEDERALLY SPONSORED RESEARCH OR DEVELOPMENT

Not Applicable.

CROSS REFERENCE TO RELATED APPLICATIONS

This application claims priority to provisional patent application Ser. No. 60/007,593, filed Nov. 27, 1995, by the same inventors.

BACKGROUND OF THE INVENTION

This invention relates generally to pipelines and, more particularly to a pipe placement and support system and method for installing a length of pipe over an expanse including underwater pipe.

The installation of relatively long lengths of pipe over a relatively inaccessible expanse is difficult, time consuming and expensive. For example, the underwater installation of relatively large diameter pipe, perhaps hundreds of feet in length, can be time consuming and expensive. Further, installation of relatively small diameter pipe over long distances can be labor intensive and costly. The underwater pipe can be a part of a fluid discharge system, serve as an intake for water, or be a part of a continuous pipeline such as an oil, water, or sewage pipeline. Further, such long pipelines could be used as conduit to house cable, wire or fiberoptic cable.

In conventional installations of large or small diameter pipe, numerous connections of individual pipe sections must be made. If the pipe is intended for underwater use, the sections of pipe generally are assembled underwater. The pipe generally is lowered in sections, connected by welding or other appropriate means. The multiple connections require significant time and effort and increase construction costs. Further, the pipe sections, after being connected underwater, should be secured to keep the long length of pipe in position.

It would be advantageous, therefore, to be able to connect the sections of pipe prior installation and to have an assembly and installation system that allows the simple installation and securing of the connected pipe sections, perhaps hundreds of feet long, even under water, at one time.

BRIEF SUMMARY OF THE INVENTION

It is among the principal objects of the present invention to provide a placement and support system for installing a long section of pipe over an expanse.

It is also among the principal objects of the present invention to provide a placement and support system for installing a long section of pipe underwater.

It is another object of the present invention to have such a system wherein individual pipe sections are prefabricated and connected a site remote from the site and then easily installed.

Another object of the invention is to provide a placement and support system having a pipe pile system that functions as a rail system for lowering long lengths of connected pipe in one single operation and which eliminates numerous connections of individual pipe sections.

In accordance with the invention a placement and support system for installing long lengths of connected pipe sections and method of using the same are provided having a series of pairs of spaced apart piles that are installed at predetermined sites by pile-driving into the floor of an expanse including the floor of a body of water. Each pile has a seat at lower end and the piles are driven until the seats are positioned at the desired distance above the floor. The sections of pipe are preconnected on land or on a barge to a desired length. A prefabricated pipe saddle assembly is installed between each pair of piles and positioned above the water line by wedging or a hydraulic jack to form a series of pipe saddle assemblies. Each pipe saddle assembly has a transverse support beam. There is a pipe sleeve at each end of the support beam dimensioned to slide over the piles. A generally U-shaped pipe saddle is affixed to the transverse beam. The long pipe is positioned on the pipe saddles by crane or other appropriate means and secured to each pipe saddle by a pair of U-bolts. The wedges or jacks are removed and the pipe slowly filled with water. The pipe sleeves slide down the piles until they abut the bent seats at or near the bottom. After the pipe is positioned, the piles are filled with concrete to a point slightly above the pipe and the empty pile above the pipe is removed.

DETAILED DESCRIPTION OF THE INVENTION

Figure 1:
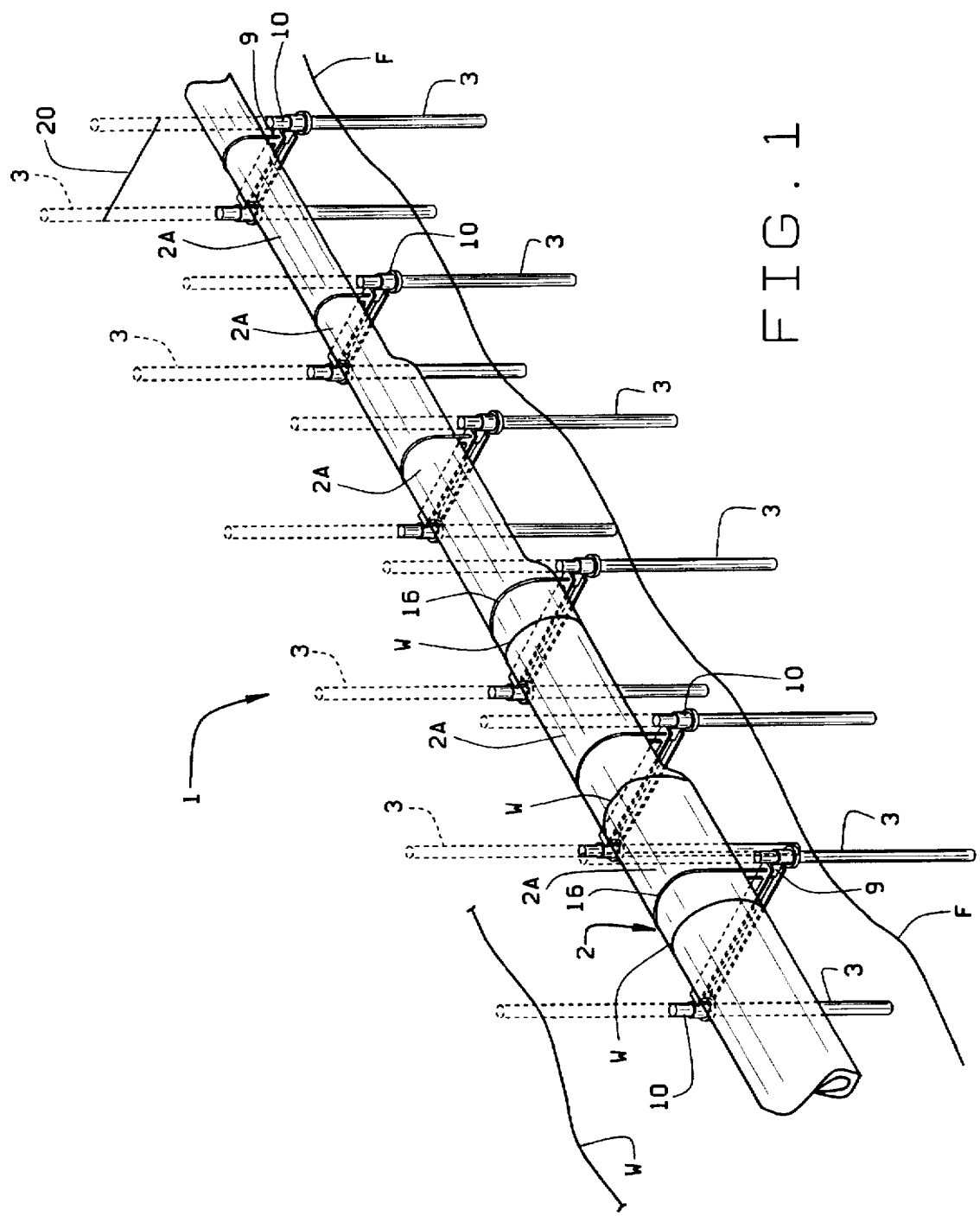
FIG. 1 is a perspective view of the pipe placement and support system of the present invention.
Figure 3:
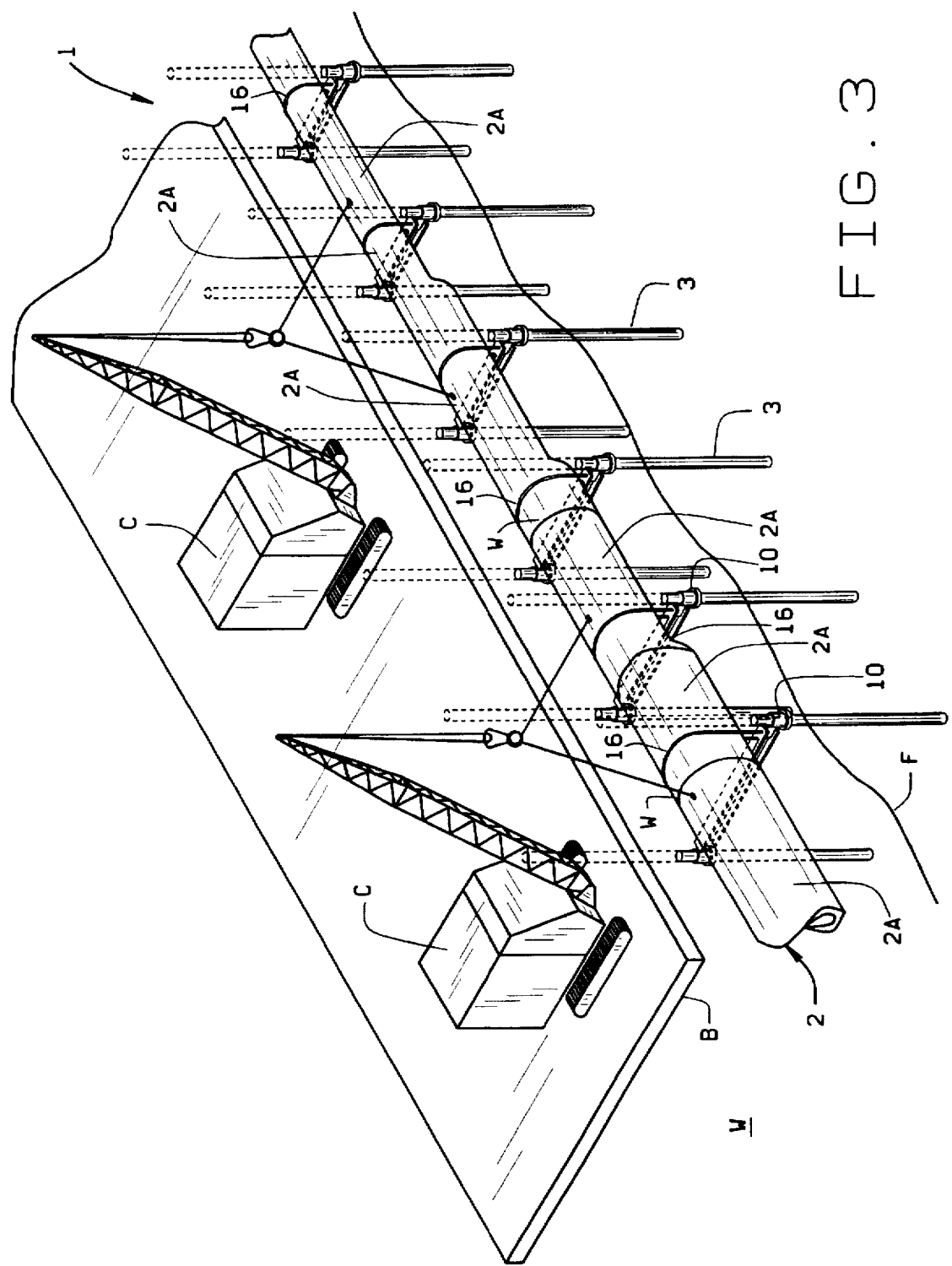
FIG. 3 is a perspective view of an installation procedure.

The pipe placement and support system of the present invention is indicated generally in the drawings by reference numeral 1. System 1 is designed for the installation over a relatively inaccessible expanse including the underwater installation of a long length of pipe 2 under the water line W in a body of water, for example under a river, a lake, creek or even offshore. The pipe can be designed as a discharge pipe, an inlet pipe, pipeline, conduit or any other long section of pipe. For example, the system of the present invention could be used to connect and submerge long sections of underwater pipeline, for example, water, oil, or sewage pipeline or can be used to install or anchor long sections of pipe in other applications. As seen in FIGS. 1 and 3, pipe 2 can be constructed by the connection of multiple smaller pipe segments 2A. The pipe segments 2A as shown in the drawings have pipe segments of decreasing diameter, which is common in discharge pipe. However, the diameter of the pipe sections is not relevant to the invention and pipe segments of uniform diameters are included in the present invention. It will be appreciated that system of the present invention allows the segments 2A to be connected by any conventional means such as welding as at W, bolts or the like on dry land and moved to the installation site on a barge or similar conveyance or can be assembled on a barge B (FIG. 3) at the installation site or moved to the installation site to avoid the necessity of interconnecting the pipe segments 2A under water. In any event, reference to a remote assembly of the pipe is intended to include any assembly of the pipe above or out of the water, including if the pipe is assembled on land and then moved to the site or assembled on a barge floating at the site.

Figure 2:
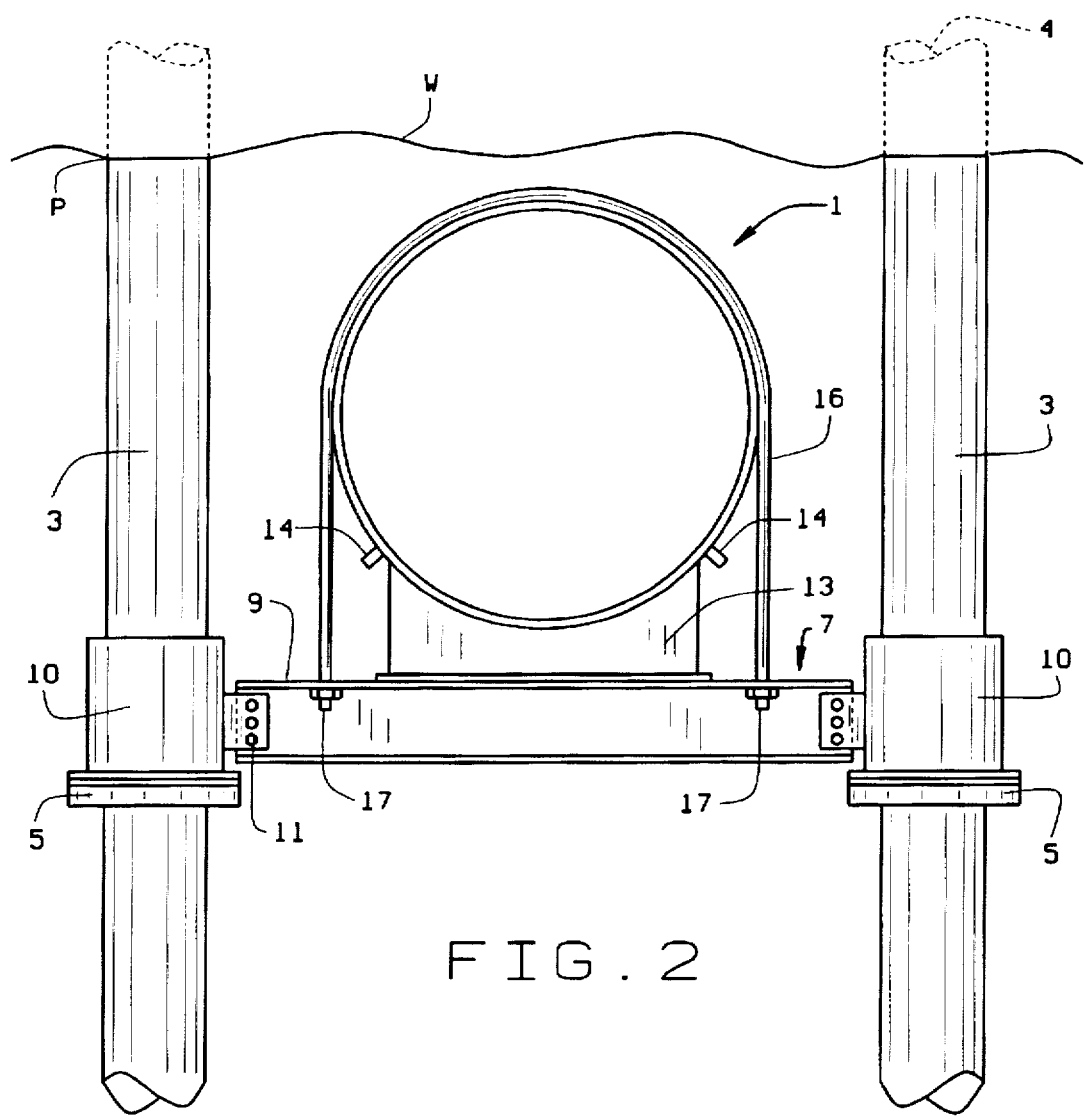
FIG. 2 is an end plan of the pipe placement and support system of the present invention.

As seen In FIGS. 1 and 3, the system 1 includes a piling comprising of plurality of spaced apart pairs of piles 3. It will be noted that the number of pairs of piles is determined by the length of pipe 2, the size of pipe 2 and the distance into water W the pipe is to extend. As best seen in FIG. 2, each pile 3 can be long section of smaller diameter pipe having an internal bore 4. The piles are shown in greater detail in FIG. 2. Each pile 3 has a seat 5 affixed thereto and positioned near the bottom end of the piling. The seat 5, as shown, is an annular collar affixed to the pile. Of course, seat 5 can be of any appropriate configuration and material to functions as a seat or stop, as will be explained below. The piles 3 and seats 5 are shop fabricated and delivered to the installation site. The piles 3 are driven into the floor F of the river until the seats 5 are positioned relative to floor 5 at a desired elevation. The elevation of the seats 5 above the floor will determine, in part, how high the installed pipe rests above the floor F. The piles 3 are positioned for driving by using a template (not shown) temporarily spanning between the piles to that each pair of piles are in line and appropriately positioned.

A pipe saddle assembly 7 is positioned between each pair of piles. As best seen in FIG. 2, each pipe saddle assembly has a transverse support beam 9. There is a pipe sleeve 10 at each end of the support beam. Each pipe sleeve 10 has inner bore and is oversized relative to the external diameter of pile 3 to allow each pipe sleeve to freely side up or down on the pile. The pipe sleeves 10 can be attached to the ends of the beam 9 by a bracket 11, direct welding or any other appropriate means. A substantially U-shaped pipe saddle 13 is affixed to the top side of beam 9. Saddle 13 is appropriately dimensioned so a segment of pipe 2 will be cradled in the saddle. It should be noted that the pipe segments 2A can have stop lugs 14 (FIG. 2) thereon to prevent rotation on pipe 2 in saddle 13.

The saddle assembly 7 also include a pair of U-bolts 16, each U-bolt is positioned on each side of the support beam and is dimensioned to encompass the pipe 2. Each U-bolt 16 has threaded ends 17 and can be secured to beam 9 by nuts or other appropriate means. Two U-bolts are employed for additional stability and to secure the pipe to the saddle in the event one of the U-bolts fails. It will be noted that the U-bolts 16 are not attached to the assembly until the pipe 2 is positioned in the saddles 13 as will now be explained in greater detail.

The method of installing the pipe 2 underwater using the system 1 is as follows and as best seen in FIG. 3:

As stated above the piles 3 are driven into the floor F of the river until the seat 5 is positioned at the floor at the appropriate position to creating a length of piling. It will be appreciated that in some applications the piles are driven to an appropriate depth so that the seats are above the floor. In other applications, the seats may be position right at the floor or even driven under floor level. The tops of the piles extend above the water level, as shown in FIGS. 1 and 3. The saddle assembly 7, which is prefabricated off-site, sans the U-bolt 16, is slidingly attached to the piles by sliding the pipe sleeves 10 over the tops of the piles. Since the sleeves 10 are oversized relative to the piles 3, the sleeves are braced or wedged or otherwise held above the water line with jacks or other appropriate means.

Once a saddle assembly 7 is positioned and braced in place above the water line on all the pairs of piles, the pipe 2 is lowered down onto the saddles. A crane C or other appropriate pieces of equipment may be used, if the pipe 2 is long and heavy. If the pipe is manageable, the pipe positioning may be done by hand. When the pipe 2 is positioned on all of the saddles, the U-bolts 16 are secured around the pipe and to the beam 9 to securely hold the pipe to the saddle assembly. The bracing can be removed and, if necessary, the pipe 2 slowly can be filled with water and so that the sleeves 10 slide down the piles 3 under the weight of the pipe 2. At the predetermined stopping point, i.e. the seats 5, the sleeves come to rest and the pipe 2 is positioned at, above or below the floor F of the river.

After pipe 2 has been lowered to its predetermined position, the bores 4 of the piles can be filled with concrete to a point P (FIG. 2) approximately level with or slightly above the top of pipe 2. After the concrete sets, the piles 3 are snapped or cut off at point P. The piles can be snapped off by bending the pile 3 from above the water line. The portions of piles 3 above the top of pipe 2 are removed so that no part of system 1 above the top of pipe 2 remains after installation.

Figure 4:
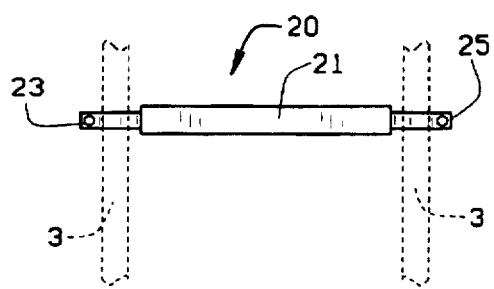
FIG. 4 is a partial perspective of a pair of piles with a top brace in place.
Figure 5:
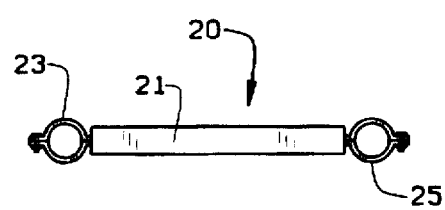
FIG. 5 is a top plan of one preferred embodiment of a top brace.

FIGS. 4 and 5 illustrate a temporary top brace, indicated generally by numeral 20. A top brace 20 is connected between each pair or selected pairs of piles after the seating of pipe 2 but before the concrete is poured into the piles to prevent lateral movement of the piles when in deep water or high river velocity conditions. The top brace 20 has a structural spanning member 21 with a clamp 23 at one end and a clamp 25, or other appropriate attachment means, for attaching the spanning member to the piles. The clamps can be loosened and the top brace removed after the piles are filled with concrete and before the tops of the piles are removed.

It will be appreciated that system 1 allows for the installation of the length of pipe 2 in a single operation, after installation of the piles 3 and saddle assemblies 7. Large diameter pipe hundreds of feet in length can be assembled on shore and then installed in one step with the aid of a hoisting crane or other equipment. It will also be appreciated that, although the system and method of the present invention is illustrated with reference to underwater pipe, those skilled in the art could envision non-underwater situations where the system of the present invention may be employed to install a length of pipe across an expanse. For example, in extending a length of pipe across a gorge or valley, it may be advantageous to set the piles of the present invention and lower preassembled pipe sections down to the seat as if the pipe were being placed under water. It also will be appreciated that various changes and modifications may be made in the foregoing description and accompanying drawings without departing from the scope of the invention. Therefore the drawings and description are intended to be illustrative only and should not be construed in a limiting sense.

We claim:

1. A placement and support system for the installation of a length of pipe over an expanse comprising;

a plurality of pairs of spaced apart piles, each said pair of piles positioned in a substantially aligned arrangement to form a piling;

a seat on a lower end of each pile; and a pipe saddle assembly slidingly engaged between each pair of spaced apart piles, said pipe saddle further comprising a support beam, a first substantially circular sleeve for slidingly engaging a pile at a first end of the support beam and a second substantially circular sleeve for slidingly engaging a pile at a second end of the support beam and a raised pipe saddle for cradling the pipe section positioned on said beam approximately midway between said first and second ends.

2. The placement and support system of claim 1 wherein the pipe saddle assembly further comprises at least one U-bolt dimensioned to secure the pipe to the pipe saddle attachable to said beam.

3. The system of claim 1 further comprising at least one cross brace for temporary placement between the pairs of space apart piles.

4. A method of installing a length of pipe across and expanse and supporting the length of pipe on the floor of the expanse comprising the steps of:

installing a plurality of pairs of spaced apart piles in the floor of the expanse, each said pile having a seat at a bottom end thereof;

installing a pipe saddle assembly between each pair of piles, the pipe saddle assembly comprising a support beam, a first pipe sleeve at a first end of the beam and a second pipe sleeve at a second end of the beam, each said sleeve dimension to engage a pile in a sliding arrangement, a pipe saddle for cradling the pipe on said beam and at least one U-bolt dimensioned to secure the pipe to the pipe saddle attachable to said beam;

bracing the pipe saddle assembly above the floor of the expanse;

positioning the length of pipe on the pipe saddles;

attaching the length of pipe to the pipe saddles with the U-bolt;

removing the bracing from the pipe saddle assembly;

lowering the pipe saddle assemblies down the piles until the pipe sleeves engage the seat.

5. The method of claim 4 further comprising the steps of filling the piles with concrete to a point above the length of pipe; and removing a portion of the pile that extends above the length of pipe.

6. The method of claim 4 further comprising the step of installing a cross brace between pairs of spaced apart piles prior to the step of filling the piles with concrete.

7. A method of installing a length of pipe under a body of water comprising the steps of:

assembling a length of pipe by connecting a plurality of shorter sections of pipe, said assembling step performed at a site remote from the body of water;

installing a plurality of pairs of spaced apart piles in the floor of the body of water, each said pile having a seat at a bottom end thereof;

installing a pipe saddle assembly between each pair of piles, the pipe saddle assembly comprising a support beam, a first pipe sleeve at a first end of the beam and a second pipe sleeve at a second end of the beam, each said sleeve dimension to engage a pile in a sliding arrangement, a pipe saddle for cradling the pipe on said beam and at least one U-bolt dimensioned to secure the pipe to the pipe saddle attachable to said beam;

bracing the pipe saddle assembly above the water line;

positioning the preassembled length of pipe on the pipe saddles;

attaching the length of pipe to the pipe saddles with the U-bolt;

removing the bracing from the pipe saddle assembly;

lowering the pipe saddle assemblies down the piles until the pipe sleeves engage the seat.

8. A piling system for the installation of a length of pipe over an expanse comprising:

a plurality of pairs of spaced apart piles, each said pair of piles positioned in a substantially aligned arrangement to form a piling;

a seat on a lower end of each pile; and a pipe saddle assembly between each pair of spaced apart piles; the pipe saddle assembly including, a support beam, a first substantially circular pile sleeve at a first end of the support beam and a second substantially circular pile sleeve at a second end of the support beam, each said sleeve dimensioned to engage a pile in a sliding arrangement whereby said pipe saddle assembly can be slidingly engaged between a pair of piles and positioned to abut said seats on said lower ends of said piles, and a pipe saddle for cradling the pipe on said beam said pipe saddle being disposed so as to elevate the pipe section above said beam at approximately a midpoint between said first and second ends.

9. The piling system of claim 8 wherein the pipe saddle assembly further comprises at least one U-bolt, dimensioned to secure the pipe to the pipe saddle attachable to said beam.

10. The piling system of claim 9 further comprising at least one cross brace for temporary placement between the pairs of space apart piles.

* * * * *